Dec. 10, 1929.

A. BROADMEYER

SHEET FEEDING APPARATUS

Re. 17,519

Original Filed Nov. 12, 1923

7 Sheets-Sheet 1

Inventor

Albert Broadmeyer

By

Attorney

Dec. 10, 1929. A. BROADMEYER Re. 17,519

SHEET FEEDING APPARATUS

Original Filed Nov. 12, 1923 7 Sheets-Sheet 2

Inventor
Albert Broadmeyer

By

Attorney

Dec. 10, 1929. A. BROADMEYER Re. 17,519
SHEET FEEDING APPARATUS
Original Filed Nov. 12, 1923 7 Sheets-Sheet 3
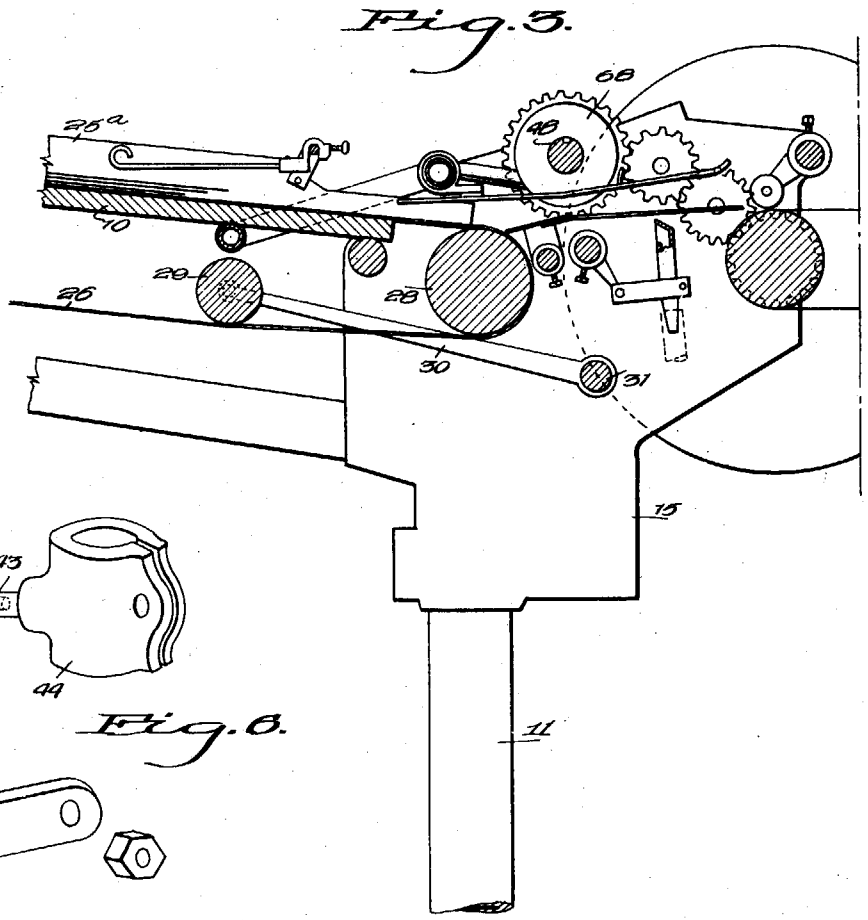
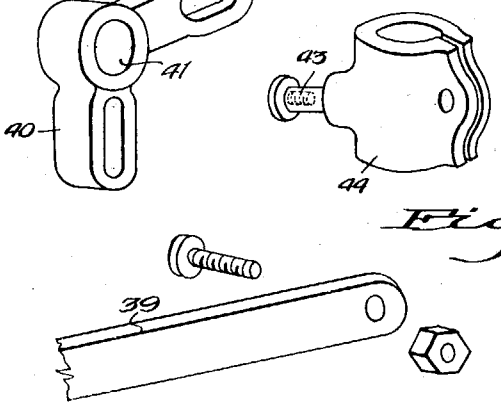
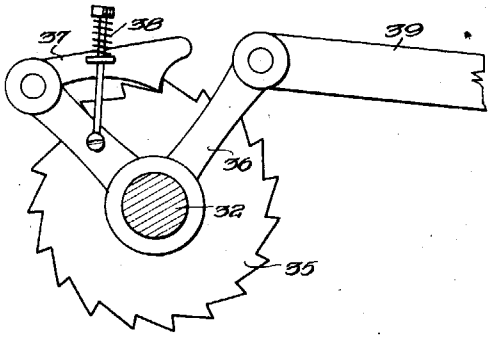
Inventor
Albert Broadmeyer
By R. B. Foster
Attorney Dec. 10, 1929.

A. BROADMEYER

SHEET FEEDING APPARATUS

Re. 17,519

Original Filed Nov. 12, 1923

7 Sheets-Sheet 4

Inventor

Albert Broadmeyer

By

Attorney

Dec. 10, 1929. A. BROADMEYER Re. 17,519

SHEET FEEDING APPARATUS

Original Filed Nov. 12, 1923 7 Sheets-Sheet 5

Inventor
Albert Broadmeyer

By

Attorney

Dec. 10, 1929. A. BROADMEYER Re. 17,519

SHEET FEEDING APPARATUS

Original Filed Nov. 12, 1923 7 Sheets-Sheet 6

Inventor

Albert Broadmeyer

By

Attorney

Dec. 10, 1929. A. BROADMEYER Re. 17,519

SHEET FEEDING APPARATUS

Original Filed Nov. 12, 1923 7 Sheets-Sheet 7

Inventor
Albert Broadmeyer

By

Attorney

Reissued Dec. 10, 1929

Re. 17,519

UNITED STATES PATENT OFFICE

ALBERT BROADMEYER, OF HARRISBURG, PENNSYLVANIA, ASSIGNOR TO THE W. O. HICKOK MANUFACTURING COMPANY, OF HARRISBURG, PENNSYLVANIA, A CORPORATION OF PENNSYLVANIA

SHEET-FEEDING APPARATUS

Original No. 1,617,893, dated February 15, 1927, Serial No. 674,334, filed November 12, 1923. Application for reissue filed June 8, 1928. Serial No. 283,986.

The present invention relates to sheet feeding apparatus and particularly to that type in which a feed table is associated with a supply table, and mechanism is provided for delivering the paper from the supply table to the feed table, and from the feed table to the instrumentalities that operate on the individual sheets, as for example, a ruling machine, printing press, folding machine or the like.

One of the objects of the invention is to provide feeding mechanism that will successfully operate on any size of sheet within the maximum capacity of the apparatus.

A further and important object is to provide novel means for transferring the sheets from the supply table to the feed table, and for controlling the transfer and feeding operations at the delivery end of the feeding table by mechanism that is dependent on the amount of material or number of sheets at said delivery end of the feed table.

The preferred embodiment of the invention is illustrated in the accompanying drawings, wherein:—

Figure 3 is a detail vertical sectional view taken on the line 3—3 of Figure 2.

Figure 5 is a detail view of the pawl and ratchet operating means.

Figure 6 is a perspective view of parts of the bell crank mounting connected to the actuating plunger for the pawl moving means.

Figure 1:
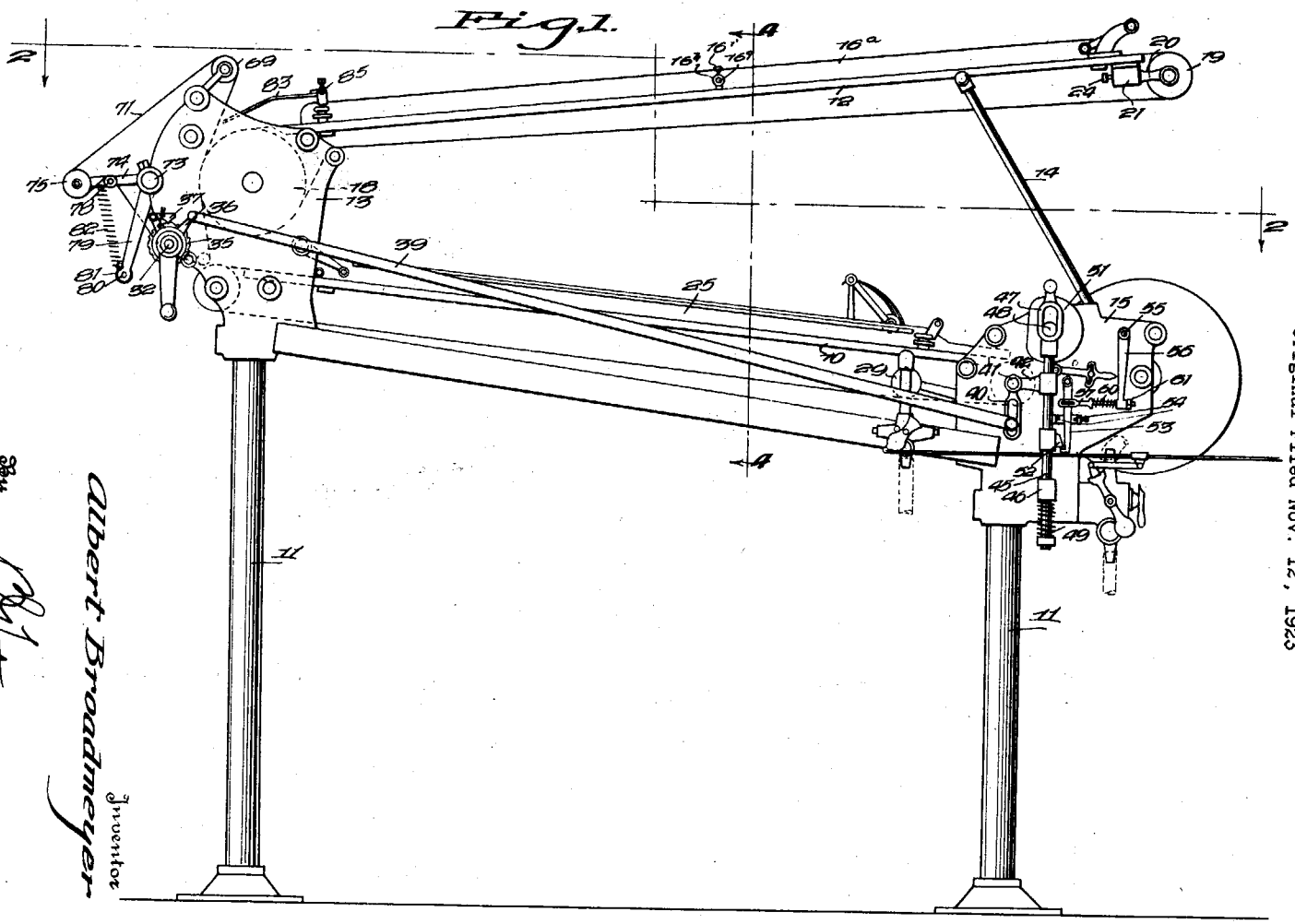
Figure 1 is a side elevation of the same.
Figure 2:
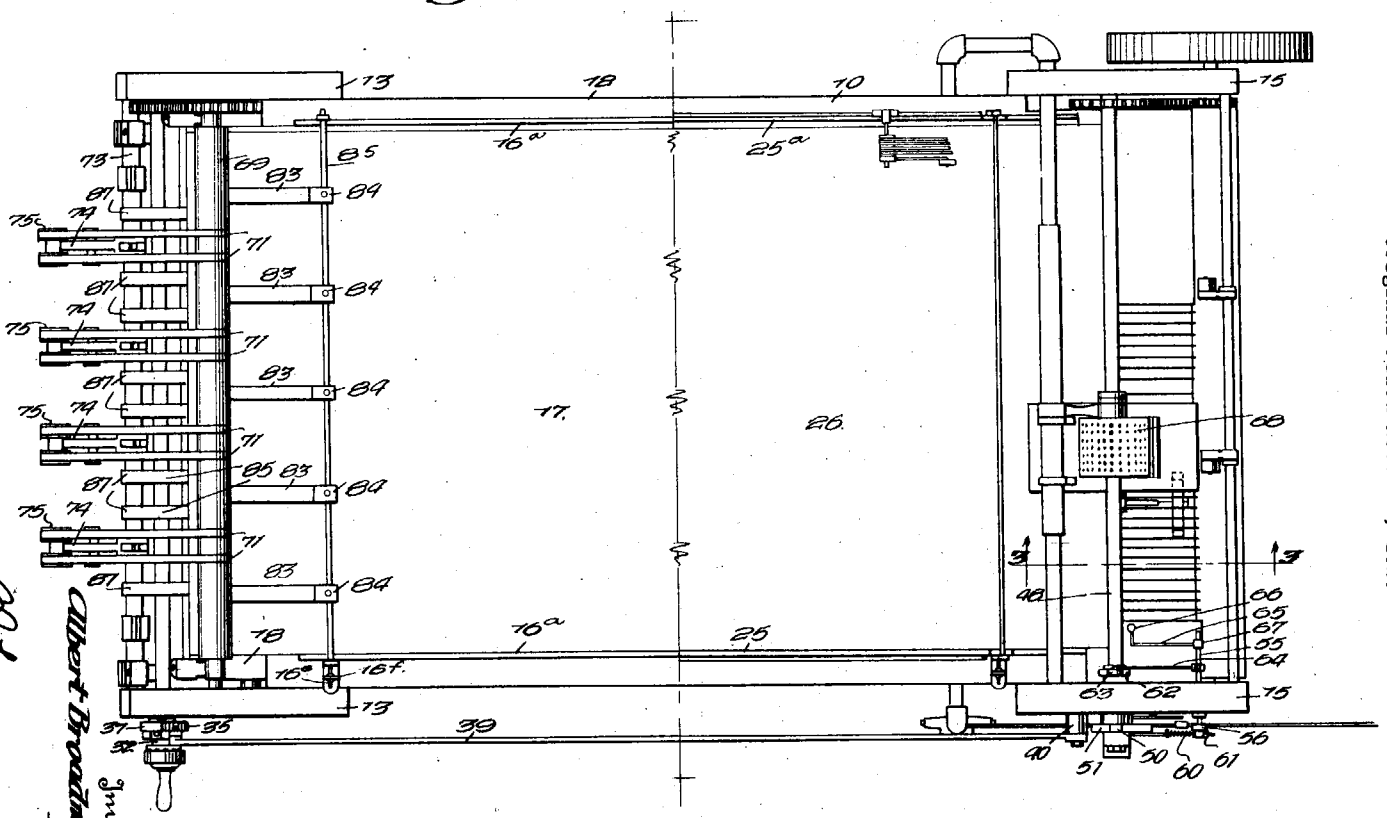
Figure 2 is a top plan view taken on the line 2—2 of Figure 1.
Figure 4:
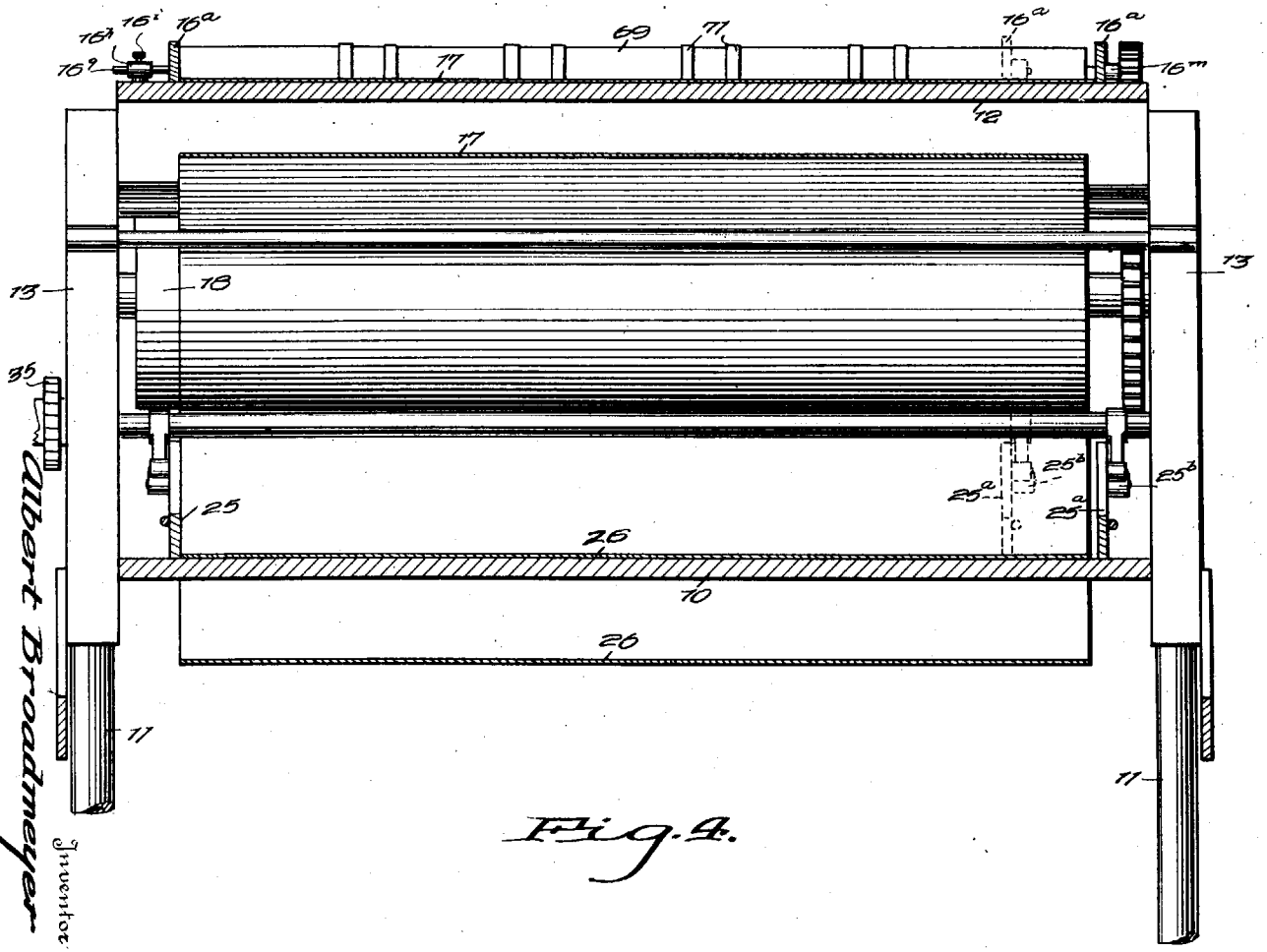
Figure 4 is a cross sectional view on the line 4—4 of Figure 1.
Figures 7, 8, 9:
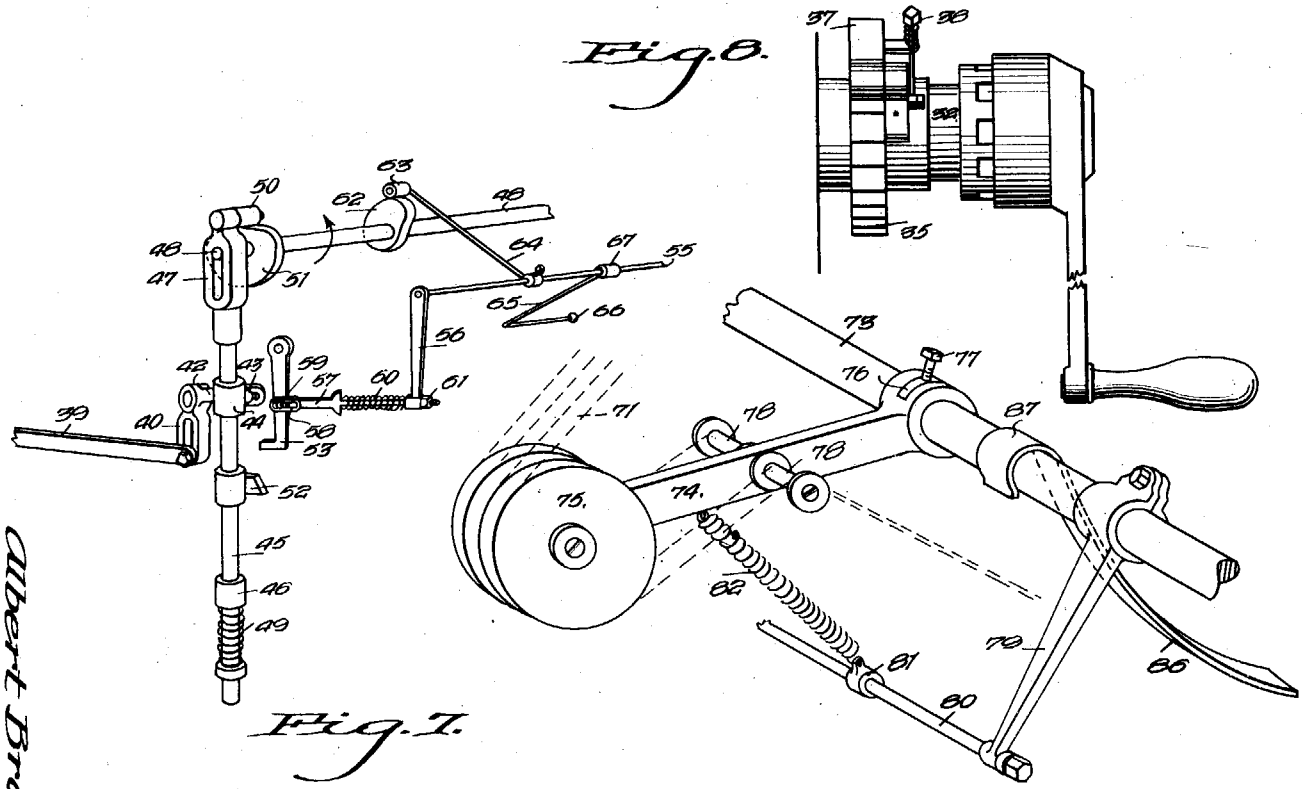
Figure 7 is a perspective view of the control mechanism for the pawl actuating means.
Figure 8 is a detail view of the manually operated setting means, for the feed mechanism.
Figure 9 is a detail perspective view of the mounting for one of the sets of tension rolls for a pair of transferring tapes.

In the embodiment disclosed, a feed table 10 is employed, supported on suitable standards 11, and in turn supporting thereabove a supply table 12. The supply table 12 is inclined reversely to the feed table 10, and has its lower end mounted in suitable frame brackets 13. Its upper end is carried by supporting rods 14 suitably based on frame brackets 15 at the lower or delivery end of the feed table 10.

Figures 10, 11:
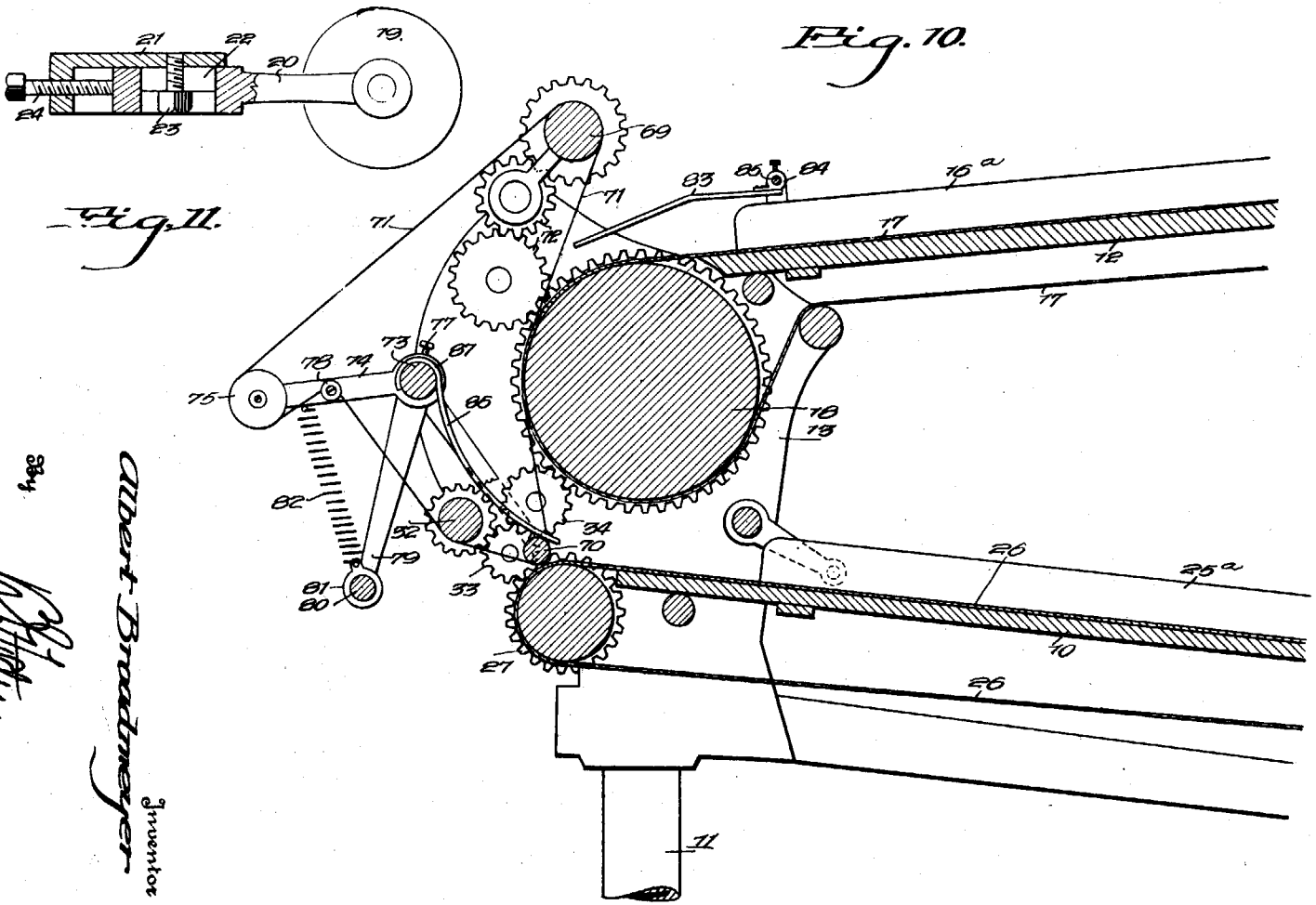
Figure 10 is a vertical sectional view through the means for transferring sheets from the supply table to the feed table.
Figure 11 is a detail view of one of the mountings of the rear guide roller for the upper belt.
Figure 12:
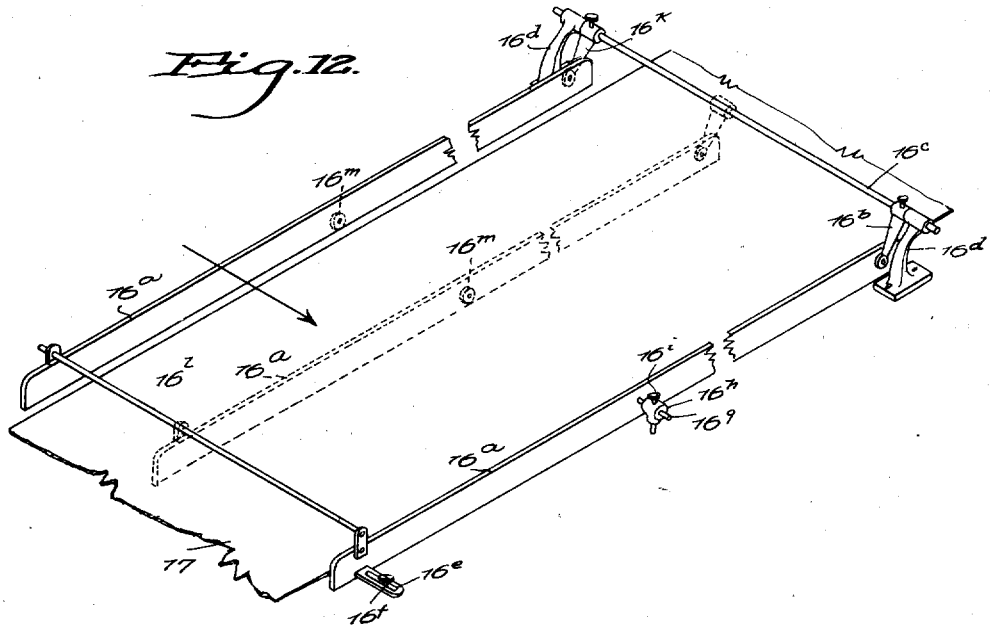
Figure 12 is a perspective view of a portion of the belt showing the adjustable side walls of the supply table.
Figure 13:
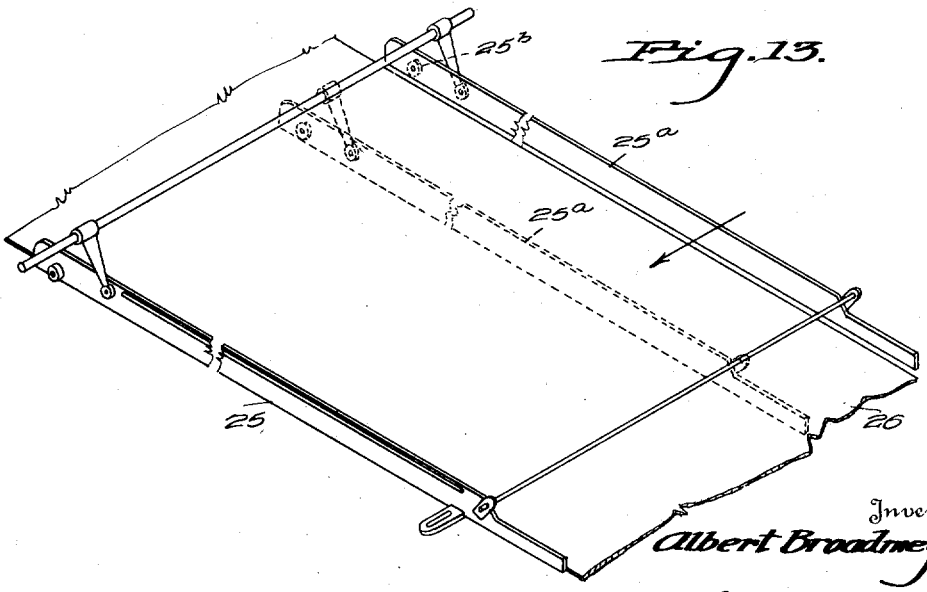
Figure 13 is a similar view of the feed table.

The upper or supply table 12 is provided with upstanding side walls 16—16$^a$, and an endless belt of a width substantially equal to the maximum distance between said side walls, has an upper stretch 17 operating over the table between said side walls. This belt passes around a directing roller 18 interposed between the lower end of the supply table 12 and the upper end of the feed table 10. Its rear end passes around a guide roller 19 located at the upper end of the supply table 12. The guide roller 19, as shown more particularly in Figure 11, is journaled in brackets 20 slidably mounted in boxes 21, and having slots 22, through which holding bolts 23 pass. Adjusting screws 24, threaded through the rear ends of the boxes 21, bear against the rear ends of the brackets 20. The side wall 16$^a$ is adjustable across the adjacent margin of the belt 17, its upper end being supported by a hanger 16$^b$ slidably mounted on a cross rod 16$^c$ that extends over the table and the belt. The cross rod is supported in brackets 16$^d$ mounted on the table on opposite sides of the belt. The lower end of the side wall 16$^a$ has an outstanding slotted arm 16$^e$, through which is passed a set screw 16$^f$. The central portion of the side wall has an outstanding stem 16$^g$ slidably mounted in a collar at 16$^h$ that is fixed to the table. A set screw 16$^i$ serves to hold the stem against movement in the collar. This wall constitutes an abutment wall. against which the pile of paper is placed. The opposite or rear side wall 16 has its upper end carried by a hanger $16^k$ that is slidably mounted on the cross rod $16^c$. Its lower end is slidably mounted on a cross rod $16^l$ fixed to the lower end of the side wall $16^a$. A roller $16^m$, journaled on the central portion of the side wall $16^a$, is adapted to ride upon the belt and thus prevent frictional contact between the side wall and the belt when the side wall is adjusted, as indicated in dotted lines in Figure 12. With this arrangement, it will be evident that the active width of the table may be varied to suit any width of paper from a very small size to the maximum that can be placed on the belt.

The lower or feed table 10 has side walls 25 and $25^a$, and over said table operates the upper stretch of an endless belt 26, having a width substantially equal to the maximum space between said side walls 25. The belt 26 at the upper end of the table 10 passes around a guide roller 27, and at the lower or delivery end of said table passes around a roller 28. A tension roller 29 rests upon the lower stretch of the belt and is journaled in swinging arms 30 pivoted, as shown at 31, to the frame brackets 15.

The side wall 25 has a limited adjustment over the belt 26 similar to the side wall $16^a$, except that as said side wall 25 does not constitute an abutment against which a pile of paper is placed, the intermediate support is eliminated. In like manner the side wall $25^a$ is adjustable toward and from the side wall 25, corresponding to the adjustment of the side wall 16. The roller, in this instance, is preferably, though not necessarily, located at the upper end of the side wall $25^a$, as shown at $25^b$.

A driving shaft in the form of a roller 32 is journaled in the frame brackets 13 and is geared, as shown at 33, to the roller 27. Gearing 34 also transmits motion from the roller or drive shaft 32, to the drum 18. This driving shaft or roller 32 projects from one side of the frame and has fixed thereto, a ratchet wheel 35. A bell crank 36 is journaled on the projecting portion of the shaft 32, and as shown in detail in Figure 5, one arm of the bell crank has pivoted thereon a pawl 37 that operates on the teeth of the ratchet wheel 35. The pawl is spring-pressed, as shown at 38, so as to maintain its engagement with the teeth. The other arm of the bell crank 36 has pivoted thereto a link 39 extending longitudinally of the feed table 10 to the delivery end of the same. Said end of the link is adjustably and pivotally connected to the depending arm 40 of a bell crank pivoted, as shown at 41, on the frame bracket 15. The other arm 42 of the bell crank is pivotally engaged with a stud 43, carried by a collar 44 adjustably mounted on a reciprocatory actuating plunger 45. The plunger 45 is vertically disposed, its lower end sliding in a guide 46, its upper end being slotted, as shown at 47, and sliding on a transverse shaft 48 extending across the delivery end of the machine. A spring 49, operating on the lower end of the plunger rod 45, serves to normally move it downwardly. The upper end of said plunger rod carries a roller 50 operating on a cam 51 carried by the shaft 48.

It will thus be evident that when the shaft 48 and cam 51 are rotated, the plunger 45 will be reciprocated, thereby swinging the bell crank 40—42, causing the longitudinal reciprocation of the link 39 and the back and forth movement of the pawl carrier bell crank 36. This will obviously cause the step-by-step rotation of the roller shaft 32 and the consequent movement of the belts 17 and 26 and the transfer roller 18. By shifting the pivotal mounting of the link in the depending arm 40 of the bell crank, the effective throw of the link and therefore of the pawl can be varied in order that the feed will be changed to the length of the sheets passing through the apparatus.

The operation of these parts is controlled by the thickness or number of sheets at the delivery end of the feed table 10. The plunger 45 is provided with a laterally extending lug 52, and a swinging latch 53 pivoted to the frame bracket 15, is adapted to move to and from a position beneath and in the path of the lug 52. Swinging movement of this latch is limited by oppositely arranged adjustable stops 54. A rock shaft 55, journaled in the said frame bracket 15, is provided with a depending arm 56, in the lower end of which is slidably engaged a link member 57, and said link member has a slot 58 in which is engaged a pin 59 carried by the latch 53. A spring 60 on the link member 57 serves to normally secure its movement with the arm 56, and an adjusting nut 61, threaded on the outer end of the link member. The shaft 48, which carries the plunger actuating cam 51, also carries a cam 62, and operating on said cam, is a roller 63 journaled on the free end of an arm 64 that is carried by the rock shaft 55. The cams 51 and 62 are so related that normally the latch 53 will be withdrawn from beneath the lug 52 when the actuating plunger 45 is permitted to drop by the cam 51, and said latch is alternately moved into and out of the path of said lug on each reciprocation of the actuating plunger 45. Secured to the inner end of the rock shaft 55 is another crank arm 65, having at its free end a ball or head 66 which is adapted to rest upon the sheets moved to the delivery end of the table. This crank arm 65 is mounted on the rock shaft 55 and is capable of adjustment longitudinally along the same. When the body of sheets is at or below a predetermined thickness, the arm 65 and head 66 will be allowed to swing downwardly, thereby per-

BEST AVAILABLE COPY mitting the outward movement of the latch 53 from beneath the holding lug 52, but if the thickness of the sheets increases, said arm and head act as a detector, and will prevent the full rocking movement of the shaft 55, thereby preventing the outward movement of the latch 53 to its inactive position. As a consequence the lug 52 will rest upon the latch and the actuation of the feeding means will be stopped. As soon, however, as the thickness of the pile decreases sufficiently the arm 65 will again be permitted to drop, the latch will resume its normal swinging movements to an inoperative position and the operation will again begin. By adjusting the nut 61 threaded on the link member 57, the position of the arm 56 will be varied, thereby raising or lowering the detector ball so that the amount of paper that is permitted to come beneath it for operation on by the suction roller can be varied.

Any suitable mechanism may be employed for feeding the sheets from the delivery end of the apparatus, such as combing or delivering rollers, rubber push fingers, or suction devices, well known to those skilled in this art. In the present embodiment there is disclosed a suction roller 68 carried by the shaft 48. This roller may be of the type disclosed in Patent No. 1,494,303, dated May 13, 1924.

In order to insure the proper passage of the paper from the upper belt 17 to the lower belt 26 and around the transfer roller 18, the following mechanism is preferably employed. An upper guide roller 69 is located above the transfer roller 18 and a lower guide roller 70 is located below said transfer roller and adjacent to the roller 27. Around these rollers pass sets of endless tapes 71 that operate against the portion of the upper belt 17 passing around the roller 18. These tapes are driven by gearing 72, extending from the gear of the roller 18 to the upper guide roller 69. Extending alongside the roller 18 is a supporting rod 73, on which are journaled a plurality of carrying arms 74. Each of these arms has journaled on the opposite sides of its free end tension rollers 75, around which a set of tapes 71 pass. The arms 74 are adjustable along the supporting rods 73 and can be held at any desired position by collars 76 secured by set screws 77, the collars being located in bifurcations in the pivoted ends of the arms 74. Guide pulleys 78 are preferably mounted on intermediate portions of the arms 74 and around them the said tapes pass. Secured to the supporting rods 73 are other arms 79 connected by a rod 80, on which are slidably mounted collars 81. Connecting these collars with the carrier arm 74 are springs 82. The structure is such that the springs 82 serve to hold the tapes 71 taut. It will be evident however, that as the sheets pass around the transfer roller 18, the portions of the tapes coacting therewith will be separated from the roller, and this separation is permitted by the swinging of the arms 74 against the tension of the springs 82. Directing fingers 83 are pivotally mounted, as shown at 84, on a cross rod 85 at the delivery end of the upper table 12, and have their free ends extending over the transfer roller 18 and to points adjacent to the tapes 71. Other directing fingers in the form of curved springs 86 have hooked ends 87 embracing the supporting rod 73, and have their lower ends resting on the guide roller 70, these fingers extending between the tapes 71.

With this construction, it will be evident that a pile of sheets placed upon the upper stretch of the belt 17 on the supply table 12, will be carried downwardly, and passed around the transfer roller 18 on to the belt of the feeding table 26, the transfer mechanism insuring the proper frictional or carrying engagement with the belt around the roller 18. The sheets in turn will be carried longitudinally along the feed table 10 on the belt 26 and the sheets will be successively delivered from the machine by the suction roller 68.

During the reciprocation of the actuating plunger the cam 62 is causing the swinging of the arm 64, thereby alternately raising and lowering the arm 65, having the ball or head 66 thereon, so that the paper sheets can pass thereunder. As long as the sheets at the delivery end do not exceed a predetermined number, the ball will drop sufficiently to permit the shaft to turn and withdraw the latch 53 from beneath the lug 52, but whenever the supply exceeds that desired, this detector will not be permitted to drop because of the paper beneath it, and consequently the latch cannot swing outwardly, but will maintain its position beneath the lug and hold the actuating plunger against operation. The use of belts on the table has been found peculiarly advantageous in that sheets of any width less than the distance between the side walls may be fed without difficulty and the only adjustment that may be necessary is of the side walls and transfer tapes 71. These being located in sets, said sets can be relatively adjusted and will cooperate with the transfer roller and the directing fingers to insure the proper delivery of the sheets from the upper to the lower table.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a sheet feeding apparatus, the combination with a supply table, of a feed table, a roller around which the sheets pass from the supply table to the feed table, a plurality of flexible bands cooperating with the roller to direct the sheets about the same, and means independent of the roller, on which the bands are mounted, said means permitting the relative adjustment of the bands to different positions longitudinally of the roller.

2. In sheet feeding apparatus, the combination with a supply table, of a feed table, a roller around which the sheets pass from the supply table to the feed table, a sheet delivering belt that operates around the roller and has a width substantially equal to the table, a plurality of flexible bands cooperating with the roller and the portion of the belt passing around the same to direct the sheets on said belt about the roller, and means, independent of the roller, on which the bands are mounted, said means permitting the relative adjustment of the bands to different positions longitudinally of the roller.

3. In sheet feeding apparatus, the combination with a supply table, of a feed table, a roller around which the sheets pass from the supply table to the feed table, a sheet delivering belt having a portion beneath the roller for receiving the sheets therefrom, said belt having a width substantially equal to the active portion of the feed table, a roller below the first roller and about which the belt passes, a plurality of flexible bands cooperating with the first roller to direct sheets about the same, and means for mounting said bands independently of both rollers and positioning the lower portions of said bands adjacent to the belt.

4. In sheet feeding apparatus, the combination with a supply table, of a feed table, a roller around which the sheets pass from the supply table to the feed table, a sheet delivering belt having a portion beneath the roller for receiving the sheets therefrom, said belt having a width substantially equal to the active portion of the feed table, a roller below the first roller and about which the belt passes, a plurality of flexible bands cooperating with the first roller to direct sheets about the same, and means for mounting said bands independently of both rollers and positioning the lower portions of said bands adjacent to the belt, said means permitting the relative adjustment of the bands to different positions longitudinally of the roller.

5. In sheet feeding apparatus, the combination with a supply table, of a feed table for receiving the sheets from the supply table, a roller around which the sheets pass from the supply table to the feed table, an endless band coacting with the roller for directing the sheets thereabout, guides for the band above and below the roller, a supporting rod, a tension pulley for the band having a swinging support on the rod, and a spring operating on the support.

6. In sheet feeding apparatus, the combination with a supply table, of a feed table for receiving the sheets from the supply table, a roller around which the sheets pass from the supply table to the feed table, an endless band coacting with the roller for directing the sheets thereabout, guide rollers for the band above and below the roller, a supporting rod, a tension pulley for the band having a swinging support mounted on and adjustable along the rod, and a spring operating on the support.

7. In sheet feeding apparatus, the combination with a supply table, of a feed table, a roller around which the sheets pass from the supply table to the feed table, endless bands cooperating with the roller to direct the sheets thereabout, guide rollers around which the bands pass, pulleys about which the bands pass, and mountings for said pulleys adjustable longitudinally of the first roller for positioning the bands at different positions with respect thereto.

8. In sheet feeding apparatus, the combination with a supply table, of a feed table for receiving the sheets from the supply table, a roller around which the sheets pass from the supply table to the feed table, a plurality of endless bands cooperating with the roller to direct the sheets therearound, carrier rollers for the bands, and supports on which the rollers are mounted, said supports and rollers being relatively adjustable toward and from each other.

9. In sheet feeding apparatus, the combination with a supply table, of a feed table for receiving the sheets from the supply table, a roller around which the sheets pass from the supply table to the feed table, a plurality of endless bands cooperating with the roller to direct the sheets therearound, upper and lower guides for the bands above and below the roller that permit the relative adjustment of the bands towards and from each other, yielding tension supports relatively adjustable toward and from each other, and tension pulleys carried by the supports and bearing against the bands.

10. In sheet feeding apparatus, the combination with a supply table, of a feed table for receiving the sheets from the supply table, a roller around which the sheets pass from the supply table to the feed table, a plurality of endless bands cooperating with the roller to direct the sheets therearound, upper and lower guide rollers for the bands above and below the roller that permit the relative adjustment of the bands towards and from each other, a bar disposed longitudinally of the rollers, arms pivotally mounted on the bar and relatively adjustable therealong, tension pulleys on the arms bearing against the bands, and springs operating on the arms.

11. In sheet feeding apparatus, the combination with a supply table, of a feed table, a roller around which the sheets pass from the supply table to the feed table, endless bands cooperating with the roller to direct the sheets thereabout, upper and lower guide rollers around which the bands pass, pulleys about which the bands pass, swinging arms supporting the pulleys, a rod located longitudinally of the first roller and on which the arms are slidably mounted, and springs connected to the arms for yieldingly holding them with the bands taut.

12. In sheet feeding apparatus, the combination with a supply table, of a feed table that receives the sheets therefrom, a roller about which the sheets pass from the supply table to the feed table, endless bands located in sets and cooperating with the roller to direct the sheets therearound, and supporting means for said bands including swinging tension arms, and sets of pulleys mounted on each arm, and a set of bands passing across each set of pulleys.

13. In sheet feeding apparatus, the combination with a supply table, of a fed table that receives the sheets therefrom, a roller about which the sheets pass from the supply table to the feed table, endless bands located in sets and cooperating with the roller to direct the sheets therearound, upper and lower guide rollers above and below the first roller and about which the bands pass, a supporting bar, carrier means pivotally mounted on the bar, and adjustable along the same, springs operating on the arms, and sets of pulleys carried by each arm and having a set of the bands passing thereacross.

14. In sheet feeding apparatus, the combination with a supply table, of a feed table that receives the sheets therefrom, sheet carrying belts operating over the tables and being of substantially the widths thereof, a directing roller for the sheets interposed between the tables, a plurality of endless tapes cooperating with the roller to direct the sheets around the latter, and means for adjusting the tapes transversely of the belt to different positions with respect thereto.

15. In sheet feeding apparatus, the combination with a supply table, of a feed table that receives the sheets therefrom, sheet carrying belts operating over the tables and being of substantially the widths thereof, a directing roller for the sheets interposed between the tables, a plurality of endless tapes cooperating with the roller to direct the sheets around the latter, and a plurality of inwardly declined fingers extending between the tapes in rear of the roller.

16. In sheet feeding apparatus, the combination with a supply table, of a feed table, mechanism for moving sheets over the tables and for delivering sheets from one end of the feed table, and means determined by the thickness of the set of sheets at the delivering end of the feed table and located at said delivery end for automatically governing the operation of the transferring mechanism.

17. In sheet feeding apparatus, the combination with a supply table, of a feed table, mechanism for moving sheets over the tables, and for delivering sheets from one end of the feed table, a vertically movable thickness detector at the delivery end of the feed table, and control mechanism for the transferring mechanism at the delivery end of the feed table and operated by the detector.

18. In sheet feeding apparatus, the combination with a supply table, of a feed table, mechanism for moving sheets over the tables and for delivering sheets from one end of the feed table, including an operating device at the delivery end, a latch at said delivery end for holding the operating device against an operating movement, and a thickness detector at the delivery end of the feed table and controlling the latch.

19. In sheet feeding apparatus, the combination with a supply table, of a feed table, mechanism for moving sheets over the tables, and for delivering sheets from one end of the feed table, including a reciprocatory operating device at the delivery end of the feed table, a latch at the delivery end of the feed table for holding the operating device against an operating movement, and a thickness detector at the delivery end of the feed table and controlling the latch.

20. In sheet feeding apparatus, the combination with a supply table, of a feed table, mechanism for moving sheets over the tables and for delivering sheets from one end of the feed table, including an operating device at said end, a pivotally mounted latch also at said end that swings into and out of the path of a portion of the operating device, and means governed by the sheets for controlling the movement of the latch.

21. In sheet feeding apparatus, the combination with a supply table, of a feed table, mechanism for moving sheets over the tables and for delivering sheets from one end of the feed table, including an operating device at said end, a pivotally mounted latch at said end that swings into and out of the path of a portion of the operating device, a rock shaft connected to the latch, and a device for operating the rock shaft to swing the latch.

22. In sheet feeding apparatus, the combination with a supply table, of a feed table, mechanism for moving sheets over the tables and for delivering sheets from one end of the feed table, including an operating device at said end, a pivotally mounted latch at said end that swings into and out of the path of a portion of the operating device, a rock shaft connected to the latch, and a thickness detector arm that rests upon the sheets at the delivery end of the feed table to control the position of the latch.

23. In sheet feeding apparatus, the combination with a supply table, of a feed table, and means for moving sheets thereover and delivering them from one end of the feed table, operating mechanism for the sheet moving means, including an actuating device at said end, a latch movable in and out of position to hold the device, means for alternately effecting the movements of the latch and actuating device to permit the operation of the latter, and means controlled by the sheets for holding the latch against such movement to hold the actuating device.

24. In sheet feeding apparatus, the combination with a supply table, of a feed table and means for moving sheets thereover and delivering them from one end of the feed table, operating mechanism for the sheet moving means including an actuating device, a latch movable into and out of position to hold the device, cams for alternately effecting the movements of the latch and actuating device to permit the operation of the latter, and a thickness detector associated with the latch and operating thereon to hold the latch against such movement and thereby to hold the actuating device.

25. In sheet feeding apparatus, the combination with a supply table, of a feed table, and means for moving sheets thereover and delivering them from one end of the feed table, operating mechanism for the sheet moving means, including an actuating device, a latch movable into and out of position to hold the device, sheet feeding means including a shaft, cams on said shaft, one of which operates on the actuating device, a rock shaft connected to the latch, said rock shaft being operated by the other cam, and a thickness detector controlling the movement of the rock shaft.

26. In sheet feeding apparatus, the combination with a supply table, and a feed table, of belts operating thereover, means for transferring the sheets from the belt of the supply table at one end of the same to the belt of the feed table at the same end, operating means for said transfer mechanism and belts including a ratchet wheel at said adjacent ends of the tables, a pawl operating on the ratchet wheel, a reciprocatory actuating device having a link connection with the pawl and located at the delivery end of the feed table, sheet feeding means at said delivery end, a swinging latch that moves into and out of the path of the reciprocatory actuating device, devices for respectively moving the actuating device and the latch to prevent the interference of the latter with the former, and a thickness detector that is movably supported on the sheets and operated to hold the latch in position to stop the actuating device when an abnormal number of sheets is at the delivery end of the feed table.

27. In sheet feeding apparatus, the combination with a sheet holding and feeding table, of means for delivering sheets from the table, and means for governing the supply of the sheets at the delivery means, comprising a ratchet mechanism, an actuating member having a substantially vertical up and down movement a latch controlling the downward movement thereof, means for alternately moving the latch into and out of its controlling position, a link connection between the actuating member and the ratchet mechanism and located transversely of the former, and means governed by the sheets for holding the latch in its controlling position and thereby preventing the operation of the actuating member.

28. In sheet feeding apparatus, the combination with a sheet holding and feeding table, of means for delivering sheets from the table, and means for governing the supply of the sheets at the delivery means, comprising a ratchet mechanism, an actuating member having a substantially longitudinal reciprocatory movement, a link extending transversely of the actuating member and constituting a connection between it and the ratchet mechanism, a latch movable into and out of the path of a portion of the actuating member to hold the latter against an operative movement, means for automatically moving the latch to and from such position to normally permit the movement of the actuating device, and means governed by the sheets for holding the latch in its controlling position and thereby preventing the operation of the actuating member.

29. In sheet feeding apparatus, the combination with a sheet holding and feeding table, of means for delivering sheets from the table, and means for governing the supply of the sheets at the delivery means, comprising a ratchet mechanism, an actuating member having a substantially longitudinal reciprocatory movement, a link connected to the ratchet mechanism, a bell crank connecting the link and actuating member, a latch having a swinging movement laterally of and into and out of the path of a portion of the actuating member to hold the latter against an operative movement, means for automatically swinging the latch to and from such position to normally permit the movement of the actuating device, and a detector that operates on the sheets adjacent to the delivering means and controlling the latch when the pile is too high to hold it in the path of the actuating device.

30. In sheet feeding apparatus, the combination with a table and means for carrying sheets away from the same, of an endless belt operating over the table, and relatively adjustable side walls cooperating with the belt, one of said walls being adjustable toward and from the other over the belt.

31. In sheet feeding apparatus, the combination with a table and means for carrying sheets away from the same, of a single endless belt operating over the table and of substantially the width thereof, relatively adjustable side walls cooperating with the belt, one of said walls being adjustable toward and from the other over the upper face of the belt, and means for supporting the latter wall over the belt.

32. In sheet feeding apparatus, the combination with a table and means for carrying sheets away from the same, of an endless belt operating over the table, relatively adjustable side walls cooperating with the belt, one of said walls being adjustable toward and from the other over the belt, and means for supporting the latter wall over the belt, including a roller journaled on said wall riding the belt.

33. In sheet feeding apparatus, the combination with a table and means for carrying sheets away from the same, of an endless belt operating over the table, relatively adjustable side walls cooperating with the belt, one of said walls being adjustable toward and from the other over the belt, and means for firmly fixing the other side wall so that it will constitute an abutment against which a pile of sheets may be evened.

34. In sheet feeding apparatus, the combination with a table and means for carrying sheets away from the same, of an endless belt operating over the table, a front side wall against which a pile of sheets may be abutted, cross rods extending from said wall and over the belt, and a rear side wall adjustably carried by the cross rods and movable to different positions over the belt.

35. In sheet feeding apparatus, the combination with an upper supply table, of a lower feed table, belts substantially the widths of said tables having stretches operating thereover, guiding side walls for the tables, means for supporting said side walls in different positions over the belts, means for directing sheets from the upper table to the lower table, and means for delivering the sheets from the lower table.

36. In sheet feeding apparatus, the combination with an upper supply table, of a lower feed table, belts substantially the widths of said tables having stretches operating thereover, a set of guiding side walls for each table, cross rods over each belt on which one of the side walls is adjustable toward and from the other side wall over the belt, means for directing sheets from the upper table to the lower table, and means for delivering the sheets from the lower table.

37. In sheet feeding means, the combination with a frame including standards and a bracket plate, of a sheet feeding device, means for presenting sheets to the device including a pawl and a ratchet operated on by the pawl, an operating shaft journaled in the bracket plate and having a driving member on the outer side of the same, a pawl actuating device operated by said driving member and located alongside the bracket plate, a latch device pivoted on the bracket plate and movable to and from a position to prevent the pawl operating the ratchet, a rock shaft also journaled in the bracket plate and having an arm that rests on the paper, a second arm fixed to the rock shaft, a cam operating the second arm, and a third arm actuated by the rock shaft and located alongside the bracket plate, said third arm operating the latch device.

38. In sheet feeding means, the combination with a frame including standards and a bracket plate, of a sheet feeding device, means for presenting sheets to the device including a pawl and a ratchet operated on by the pawl, an operating shaft journaled in the bracket plate and having a driving member on the outer side of the same, a pawl actuating device operated in and up and down direction by said driving member and located alongside the outer side of the bracket plate, a substantially vertical latch device pivoted to and located on the outer side of the bracket plate and movable to and from a position to prevent the pawl operating the ratchet, a rock shaft also journaled in the bracket plate and having an arm that rests on the paper, a second arm fixed to the rock shaft, a cam operating the second arm, and a third arm actuated by the rock shaft and located alongside the outer side of the bracket plate, said third arm operating the latch device.

39. The combination with a sheet feeding device for feeding sheets rearwardly from an assemblage thereof, of means out of the path of the sheets fed by the device for presenting sheets to be fed to the device including a pawl and ratchet mechanism, and means for controlling the pawl and ratchet mechanism including a latch device, a swinging actuating device for the latch element, a link connecting the actuating device and latch device, one of said devices being movable along the link, yielding means resisting such movement, means on the link for thus moving the device against the action of the resisting means and constituting a positive stop against which the spring causes the device to abut, and a device that rests on the paper and is connected to the actuating device.

40. The combination with a sheet feeding device for feeding sheets rearwardly from an assemblage thereof, of means out of the path of the sheets fed by the device for presenting sheets to be fed to the device including a pawl and ratchet mechanism, and means for controlling the pawl and ratchet mechanism including a swinging latch device, a rock shaft, a determining device carried by the rock shaft and resting on the sheets, a swinging actuating arm on the rock shaft, a link pivoted to the latch device, said actuating arm being movable along the link, a spring for resisting such movement, and an adjusting nut on the link for moving the arm against the action of the spring and constituting a positive stop against which the spring holds said arm.

41. In sheet feeding apparatus, the combination with a frame, of a sheet feeding device at the rear end of the frame for feeding sheets rearwardly therefrom, mechanism out of the path of the sheets fed by the device for presenting sheets to the feeding device for feeding thereby, said means including a pawl and a ratchet operated on by the pawl, a controlling device pivotally mounted on the rear end of the frame and movable to and from a position to prevent the pawl from operating the ratchet, a rock shaft journaled on the rear end of the frame, and having a feeler that rests on the sheets, and an arm mounted on the rock shaft and extending downwardly adjacent the controlling device and adapted to operate it when the feeler drops by reason of the withdrawal of sheets by the feeding device.

42. In sheet feeding apparatus, the combination with a frame, of a sheet feeding device at the rear end of the frame for feeding sheets rearwardly therefrom, mechanism out of the path of the sheets fed by the device for presenting sheets to the feeding device for feeding thereby, said means including a pawl and a ratchet operated on by the pawl, a controlling device pivotally mounted on the rear end of the frame and movable to and from a position to prevent the pawl from operating the ratchet, a rock shaft journaled on the rear end of the frame and at a higher point than the pivot mounting of the controlling device, a feeler carried by the rock shaft and resting on the sheets, and an arm mounted on the rock shaft and extending downwardly adjacent the controlling device and adapted to operate it when the feeler drops by reason of the withdrawal of sheets by the feeding device.

43. In sheet feeding apparatus, the combination with a frame, of a sheet feeding device at the rear end of the frame for feeding sheets rearwardly therefrom, mechanism out of the path of the sheets fed by the device for presenting sheets to the feeding device for feeding thereby, said means including a pawl and a ratchet operated on by the pawl, a substantially vertical controlling arm pivoted on the rear end of the frame and extending downwardly below its pivot axis, said arm being movable to and from a position to prevent the pawl from operating the ratchet, a rock shaft journaled on the rear end of the frame and at a higher point than the pivot mounting of the controlling device, a feeler carried by the rock shaft and resting on the sheets, and a depending arm mounted on the rock shaft and having a connection with the portion of the controlling arm below its pivot axis to operate the latter when the feeler drops by reason of the withdrawal of sheets by the feeding device.

In witness whereof I affix my signature.

ALBERT BROADMEYER.